(12) United States Patent
Maeda

(10) Patent No.: US 7,907,223 B2
(45) Date of Patent: Mar. 15, 2011

(54) STEREOSCOPIC ELECTROOPTICAL DEVICE HAVING ALTERNATING LIGHT-SHIELDING PORTIONS THAT HAVE DIFFERENT WIDTHS PROVIDED BETWEEN ADJACENT PIXELS

(75) Inventor: Tsuyoshi Maeda, Kai (JP)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 11/849,850

(22) Filed: Sep. 4, 2007

(65) Prior Publication Data

US 2008/0055500 A1 Mar. 6, 2008

(30) Foreign Application Priority Data

Sep. 6, 2006 (JP) ................................. 2006-241119

(51) Int. Cl.
*G02F 1/1335* (2006.01)
*G02F 1/1333* (2006.01)
*G02B 27/22* (2006.01)
(52) U.S. Cl. ............................ 349/15; 349/110; 359/477
(58) Field of Classification Search .................... 349/15, 349/122
See application file for complete search history.

(56) References Cited

U.S. PATENT DOCUMENTS

| 6,049,424 | A | * | 4/2000 | Hamagishi | 359/464 |
| 6,151,062 | A | * | 11/2000 | Inoguchi et al. | 348/51 |
| 2003/0214227 | A1 | * | 11/2003 | Tsuchiya | 313/504 |
| 2005/0128384 | A1 | * | 6/2005 | Song | 349/110 |
| 2007/0120768 | A1 | * | 5/2007 | Lee et al. | 345/60 |

FOREIGN PATENT DOCUMENTS

JP 03-119889 5/1991

* cited by examiner

*Primary Examiner* — Mark A Robinson
*Assistant Examiner* — Paul C Lee
(74) *Attorney, Agent, or Firm* — K&L Gates LLP

(57) ABSTRACT

An electrooptical device which simultaneously displays a first and second image in different directions. The electrooptical device includes a display panel including a plurality of pixel rows. Each pixel row includes first pixels for displaying the first image, first light-shielding portions, second pixels for displaying the second image, and second light-shielding portions which are wider than the first light-shielding portions. The electrooptical device also includes a light-transmissive substrate provided parallel to the display panel, and a light-shielding barrier layer provided on the substrate which includes apertures that align with the second light-shielding portions when viewed from a direction that is normal to the display panel.

9 Claims, 9 Drawing Sheets

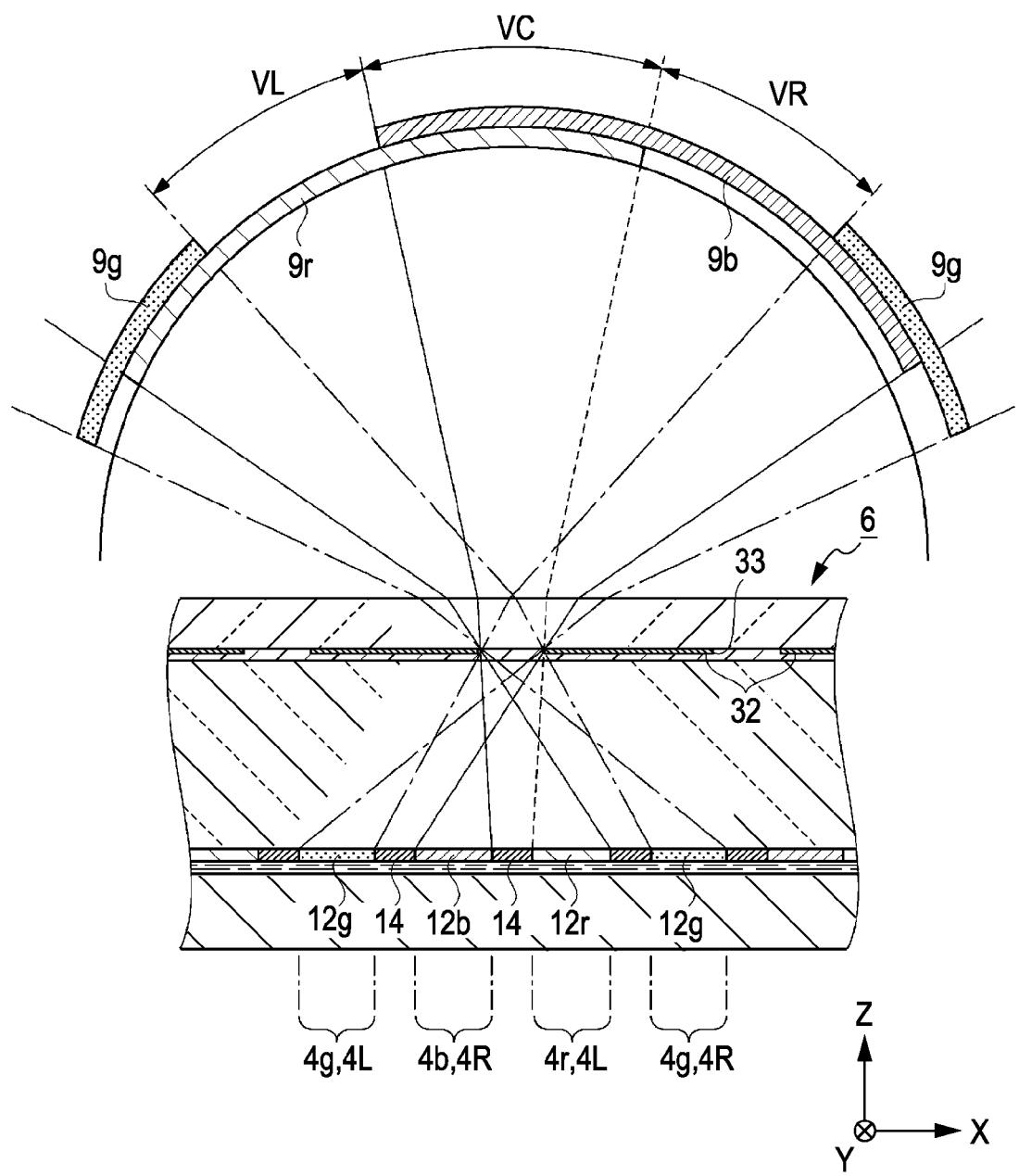

STEREOSCOPIC ELECTROOPTICAL DEVICE HAVING ALTERNATING LIGHT-SHIELDING PORTIONS THAT HAVE DIFFERENT WIDTHS PROVIDED BETWEEN ADJACENT PIXELS

BACKGROUND

The entire disclosure of Japanese Patent Application No. 2006-241119, filed Sep. 9, 2006 is expressly incorporated herein by reference.

1. Technical Field

The present invention relates to electrooptical devices. More specifically, the present invention relates to an electronic apparatus capable of simultaneously displaying two images in different directions.

2. Related Art

Electrooptical devices which are capable of simultaneously displaying two images in different directions are known in the art. Typically, such devices include a display panel, such as a liquid crystal panel, which includes a light-shield barrier layer with a number of light apertures. One example of such a device is found in Japanese Patent No. 2,857,429, which discloses a three-dimensional image display device which is capable of creating a three-dimensional display with two images.

FIG. 10 is an enlarged view of a liquid crystal device 6 which serves an electrooptical device for two-screen display. The liquid crystal device 6 includes pixels 4r, 4g, and 4b, which are arranged in matrix and configured to display red, green, and blue by using color filters 12r, 12g, and 12b (shown in FIG. 11), and light-shielding portions 14 that separate the pixels 4r, 4g, and 4b. The width of the light-shielding portions 14 is generally constant. The pixels 4r, 4g, and 4b also function as pixels 4L for displaying a first image and as pixels 4R for displaying a second image. The liquid crystal device 6 further includes a barrier layer 32 (shown in FIG. 11) with apertures 33 provided between the right ends of the pixels 4R and the left ends of the pixels 4L. In FIG. 10, hatched portions represent regions where the barrier layer 32 is provided. Generally, the width of the apertures 33 is slightly larger than the width of the light-shielding portions 14.

FIG. 11 illustrates the relationship between the viewing angle and the display of the images, by showing the light passing through an aperture 33 provided between a pixel 4b (pixel 4R) and a pixel 4r (pixel 4L) at various viewing angles. The display light from the pixel 4r passes through the aperture 33, and is displayed to the area illustrated as an angle range 9r. Similarly, the display light from pixels 4g and 4b is displayed to angle ranges 9g and 9b. As a result, only the display light from the pixel 4r is displayed in the angle range VL and only the display light from the pixel 4b is displayed in the angle range VR. Thus, only a first image corresponding to the pixel 4L is display in the angle range VL, and only a second image corresponding to the pixel 4R is displayed in the angle range VR. Using this configuration, the liquid crystal device 6 displays two different images in the angle ranges VL and VR.

One disadvantage of the current configuration, however, is that in the angle range VC, a mixture of the first image and the second image is displayed, rather than one complete image. In order to reduce the mixing of the two images, the width of the apertures 33 of the barrier layer 32 need to be close to the width of the light-shielding portions 14.

Unfortunately, however, the width of the apertures 33 is decreased to reduce size of the area where the two images are mixed, the amount of display light which is allowed to pass through the apertures 33 is reduced and the amount of brightness in the display in the angle ranges VL and VR is decreased.

BRIEF SUMMARY OF THE INVENTION

An advantage of some aspects of the invention is that the size front region with a mixed display is reduced or eliminated while maintaining the brightness of the first and second image.

One aspect of the invention is an electrooptical device which is capable of simultaneously displaying a first and second image in different directions. The electrooptical device includes a display panel including a plurality of repetitively arranged pixel rows. Each pixel row is comprised of a series of first pixels for displaying the first image, first light-shielding portions, a series of second pixels for displaying the second image, and second light-shielding portions which are wider than the first light-shielding portions. The electrooptical device also includes a light-transmissive substrate provided parallel to the display panel and a light-shielding barrier layer, which is provided on the light-transmissive substrate. The barrier layer includes apertures that coincide with the second light-shielding portions of the display panel, as viewed from a direction which is normal to the display panel.

One aspect of the invention is the ability to display two different images to an audience of viewers. On one side of the display, the a first pixel is blocked by the barrier layer and a second pixel is viewed through the aperture, so the second image and not the first image is displayed. Conversely, when viewed from the other side of the display panel, the second pixel is blocked by the barrier layer and the first pixel is viewed through the aperture, so the viewer sees only the second image and not the first image.

The width of the second light-shielding portions is larger than that of the first light-shielding portions, and the barrier layer has apertures that coincide with the second light-shielding portions. Therefore, the apertures of the barrier layer also have a large width substantially equivalent to the width of the second light-shielding portions. Thus, more light can be obtained from the apertures and there is a higher display brightness than when the width of the second light-shielding portions is equal to that of the first light-shielding portions. Further, by setting the width of the apertures to be slightly larger than the width of the second light-shielding portions, the size of the region where the first and second images are both displayed in a mixed display can be reduced while maintaining the brightness of the images.

Another aspect of the invention is an electronic apparatus which includes the electrooptical device previously described in a display section. This allows the electronic apparatus to display a first image and a second image in different directions with high brightness.

BRIEF DESCRIPTION OF THE DRAWINGS

The invention will be described with reference to the accompanying drawings, wherein like numbers reference like elements.

FIG. 11 is an explanatory view showing the cross-sectional structure of the liquid crystal device shown in FIG. 10 along with the viewing angles and the displays viewed at the viewing angles.

DESCRIPTION OF EXEMPLARY EMBODIMENTS

Figure 1:
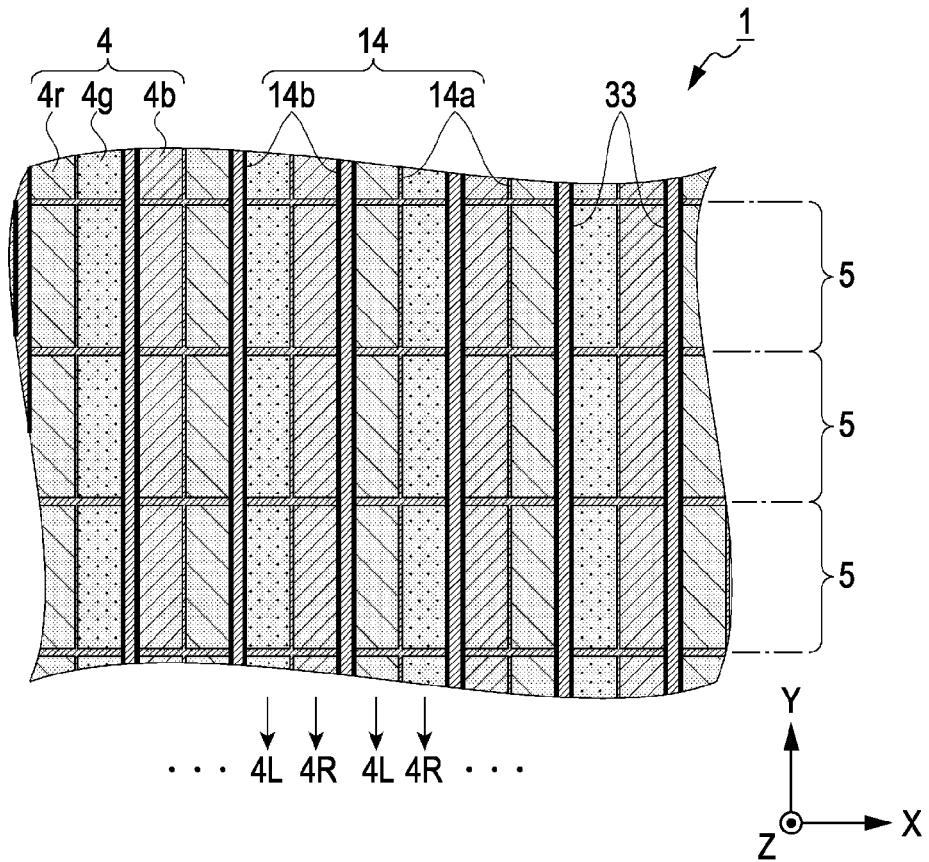
FIG. 1 is an enlarged view of a liquid crystal device according to a first exemplary embodiment of the invention.

Exemplary embodiments of the invention will be described below with reference to the drawings. Throughout the drawings, the dimensions and ratios of components may differ from actual dimensions and ratios in order to make the components more recognizable in the drawings.

First Exemplary Embodiment

Figure 2:
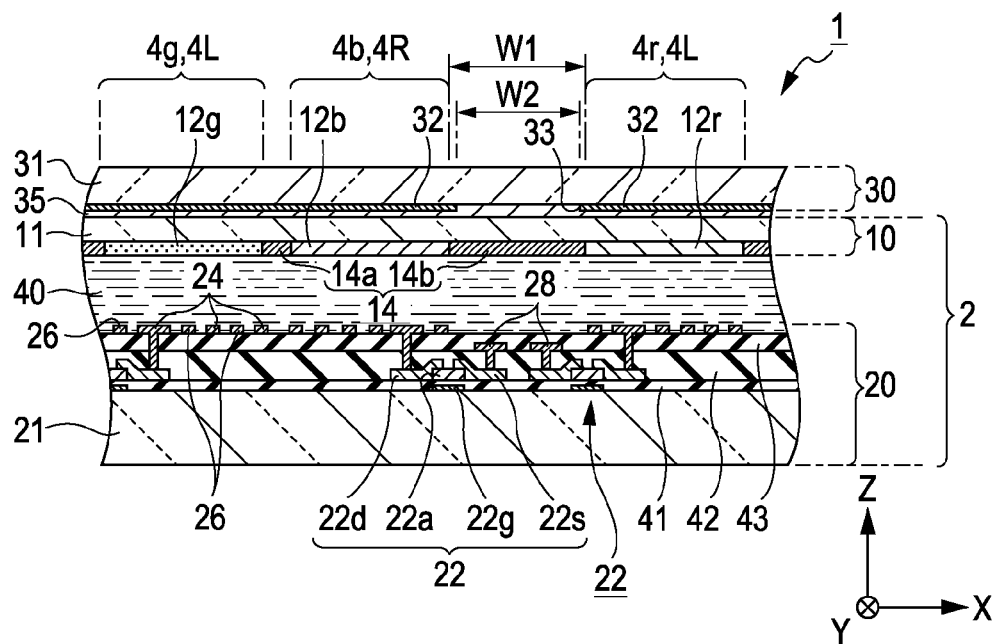
FIG. 2 is a cross-sectional view of the liquid crystal device shown in FIG. 1.

FIG. 1 is an enlarged plan view of a liquid crystal device 1, which serves as an electrooptical device according to a first exemplary embodiment of the invention. FIG. 2 is a cross-sectional view of the liquid crystal device 1 shown in FIG. 1. As shown in FIG. 2, the liquid crystal device 1 includes a liquid crystal panel 2 which serves as a display panel. A barrier mask substrate 30 is bonded to the liquid crystal panel 2 with an adhesive 35. The barrier mask substrate 30 includes a glass substrate 31, and a light-shielding barrier layer 32 provided on a surface of the glass substrate 31, which faces the liquid crystal panel 2. The glass substrate 31 is disposed parallel to the liquid crystal panel 2. The barrier layer 32 is formed of a black resin layer and has apertures 33.

Figure 3A:
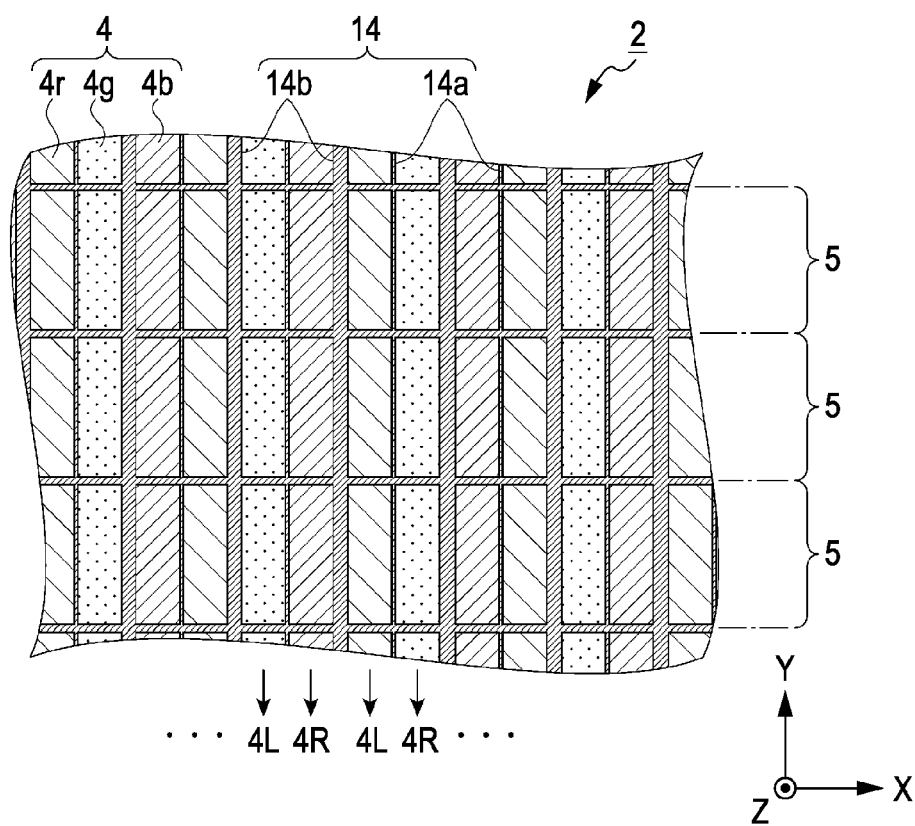
FIG. 3A is an enlarged view of a liquid crystal panel.
Figure 3B:
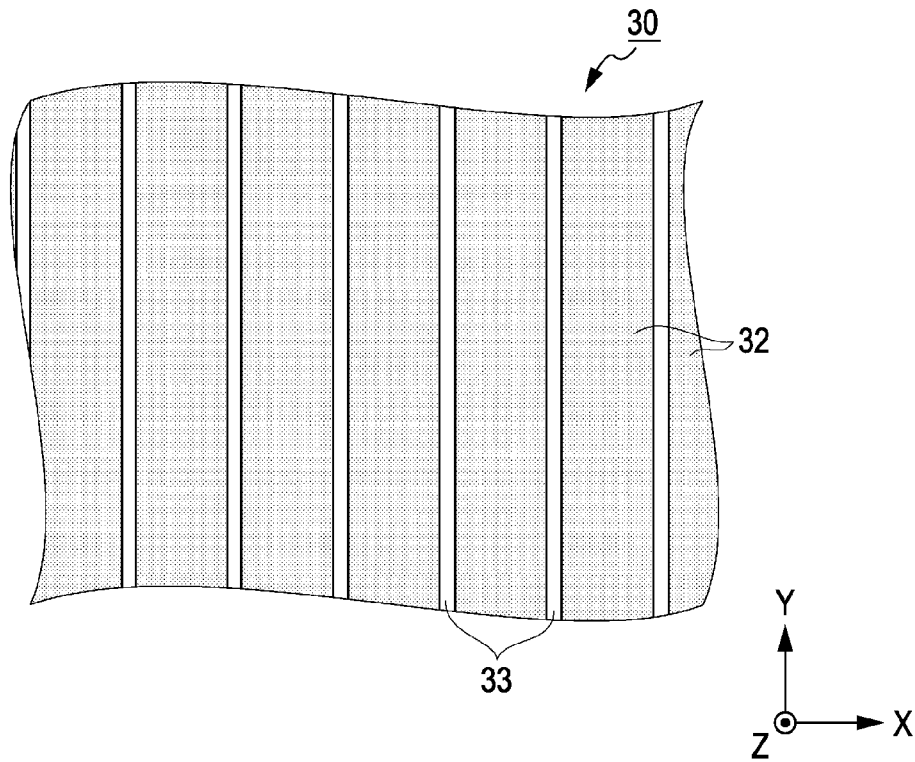
FIG. 3B is an enlarged view of a barrier mask substrate.

FIGS. 3A and 3B are enlarged views of the liquid crystal panel 2 and the barrier mask substrate 30 before bonding, respectively. The liquid crystal panel 2 and the barrier mask substrate 30 are bonded to form the liquid crystal device 1 shown in FIG. 1. Hatched portions in FIG. 1 show regions wherein the barrier layer 32 of the barrier mask substrate 30 is provided.

As shown in FIG. 3A, the liquid crystal panel 2 includes rectangular pixels 4r, 4g, and 4b (hereinafter also generically referred to as "pixels 4") that are arranged in a matrix corresponding to red, green, and blue displays. The pixels 4r, 4g, and 4b are repetitively arranged in that order in an X-axis direction, and are arranged in the Y-axis direction such that pixels of the same color form vertical stripes. Light-shielding layers 14 are provided between the adjacent pixels 4. The light-shielding layers 14 include light-shielding layers 14a and 14b which are described more fully below.

Each pixel 4 contributes to the display of a first or second image. Pixels 4 used for displaying a first image are also referred to as pixels 4L, while pixels 4 for displaying a second image are referred to as pixels 4R. The pixels 4L and 4R correspond to the first series of pixels and the second series of pixels, respectively. In the first exemplary embodiment, the pixels 4L and 4R are alternately arranged in the X-axis direction, so as to form stripes in the Y-axis direction.

Rows of pixels 4 extending in the X-axis direction are referred to as pixel rows 5. Each pixel row 5 includes a plurality of units which are repetitively arranged. In each unit, a pixel 4L, a light-shielding layer 14a serving as a first light-shielding portion, a pixel 4R, and a light-shielding layer 14b serving as a second light-shielding portion are arranged. Thus the pixels 4L and 4R are alternately used as pixels 4, and the light-shielding layers 14a and 14b are alternately used as light-shielding portions. The width of the light-shielding layers 14b is larger than the width of the light-shielding layers 14a. In the first exemplary embodiment, the light-shielding layers 14a are 10 µm in thickness, and the light-shielding layers 14b are 25 µm in thickness.

As shown in FIG. 3B, the barrier layer 32 of the barrier mask substrate 30 includes apertures 33 that align with the light-shielding layers 14b, as viewed from a direction normal to the liquid crystal panel 2. The width of the apertures 33 is slightly smaller than that of the light-shielding layers 14b. In the first exemplary embodiment, the apertures 33 are 23 µm in thickness.

Returning to FIG. 2, a liquid crystal device 1 is shown in which the liquid crystal panel 2 shown in FIG. 3A and the barrier mask substrate 30 shown in FIG. 3B are bonded. The liquid crystal panel 2 includes an element substrate 20 which opposes a counter substrate 10, and liquid crystal 40 sealed between the element substrate 20 and the counter substrate 10. The element substrate 20 includes a glass substrate 21 serving as a base material, and the counter substrate 10 includes a glass substrate 11 serving as a base material.

The element substrate 20 is a so-called TFT element substrate, and includes TFT (thin film transistor) elements 22 serving as switching elements which correspond to the pixels 4, gate lines (not shown) connected to the TFT elements 22, data lines 28, and pixel electrodes 24. The first to fourth layers are stacked on a surface of the glass substrate 21 facing the liquid crystal 40. In order to prevent a short circuit between the components on the layers, a first interlayer insulating layer 41 is provided between the first layer and the second layer, a second interlayer insulating layer 42 is provided between the second layer and the third layer, and a third interlayer insulating layer 43 is provided between the third layer and the fourth layer. While the TFT elements 22 are of a three-terminal type in the first exemplary embodiment, they can be replaced with two-terminal TFD (thin film diode) elements.

Gate electrodes 22g of the TFT elements 22 are provided in the first layer provided on the surface of the glass substrate 21.

The second layer is separated from the first layer by the first interlayer insulating layer 41 formed of $SiO_2$ or SiN. Semiconductor layers 22a of amorphous silicon are provided in the second layer such as to overlap with the gate electrodes 22g. Source electrodes 22s are provided in source regions of the semiconductor layers 22a, and drain electrodes 22d are provided in drain regions of the semiconductor layers 22a. The source electrodes 22s and the drain electrodes 22d overlap each other. The source electrodes 22s are connected to the data lines 28. One TFT element 22 is comprised of one semiconductor layer 22a, one source electrode 22s, one drain electrode 22d, and one gate electrode 22g. The TFT element 22 overlaps with the light-shielding layer 14b of the pixel 4 or is provided near the light-shielding layer 14b, as viewed from a direction that is normal to the liquid crystal panel 2. Therefore, the TFT element 22 is not located near the light-shielding layer 14a, as viewed from the direction that is normal to the liquid crystal panel 2.

The third layer is separated from the second layer by the interlayer insulating layer 42, which may be formed of, for example, $SiO_2$ or SiN. The data lines 28 are provided in the third layer, and are connected to the source electrodes 22s of the TFT elements 22 via contact holes provided in the interlayer insulating layer 42.

The data lines 28 coincide with the light-shielding layers 14b, as viewed from a direction which is normal to the liquid crystal panel 2. Therefore, the data lines 28 do not align with the relatively narrow light-shielding layers 14a. Thus, the width of the light-shielding layers 14a can be reduced while the data lines 28 are not exposed, as viewed a direction which is normal to the liquid crystal panel 2. This decreases the aperture ratio of the liquid crystal panel 2, and increases display brightness.

The fourth layer is separated from the third layer by the interlayer insulating layer 43 formed of, for example, $SiO_2$ or SiN. In the fourth layer, a light-transmissive pixel electrode 24 formed of ITO (indium tin oxide) and a common electrode 26 are provided, which correspond to each pixel 4. The pixel electrode 24 is connected to the drain electrode 22d of the TFT element 22 via a contact hole provided through the interlayer insulating layers 42 and 43. An image signal is supplied from the data line 28 to the pixel electrode 24 via the TFT element 22. The common electrode 26 is connected to a constant potential line (not shown) so as to have a constant potential.

The pixel electrode 24 and the common electrode 26 are both comb-shaped and are arranged so that teeth alternate with each other in parallel. The liquid crystal 40 sealed between the element substrate 20 and the counter substrate 10 is driven by a transverse electric field produced between the pixel electrode 24 and the common electrode 26. The aligning direction of liquid crystal molecules changes in a plane which is parallel to the glass substrate 21. This liquid crystal mode is called IPS (in-plane switching). In this mode, a wide viewing angle can be obtained because the liquid crystal molecules are continuously driven in the direction which is parallel to the glass substrate 21. An alignment film formed of polyimide (not shown) is provided on a surface of the fourth layer.

Color filters 12r, 12g, and 12b (hereinafter also generically referred to as color filters 12) are provided corresponding to the respective pixels 4 on a surface of the glass substrate 11. The light-shielding layers 14 (including the light-shielding layers 14a and 14b) formed of black resin are provided in the same layer as that of the color filters 12. The width W1 of the light-shielding layers 14b in the pixel row direction is larger than the width W2 of the apertures 33 of the barrier layer 32 in the barrier mask substrate 30. The color filters 12 are formed of a resin that absorbs a component of incident light having a specific wavelength. Light (that is, display light) can have predetermined colors (e.g., red, green, and blue) by passing through the color filters 12r, 12g, and 12b. An alignment film (not shown) formed of polyimide is provided on the color filters 12. An overcoat formed of a light-transmissive resin can also be provided on the color filters 12.

The glass substrate 11 is processed by chemical etching or CMP (chemical mechanical polishing) so that it has a thickness of approximately 50 μm. During the processing, the distance between the color filter 12, from which display light is substantially emitted, and the aperture 33 of the barrier layer 32 may be adjusted. Thus, the angle of an optical path extending from the color filter 12 to the aperture 32 is adjusted. This allows the liquid crystal device 1 to display a first image and a second image at proper angles.

The above-described barrier mask substrate 30 is bonded on a surface of the glass substrate 11 opposite to the liquid crystal 40 with the adhesive 35. An overcoat formed of a light-transmissive resin can be provided on a surface of the barrier layer 32 in the barrier mask substrate 30 in order to protect the barrier layer 32 before bonding.

A polarizing plate (not shown) is bonded to an outer side of each of the glass substrates 21 and 31. The transmission axes of the polarizing plates are orthogonal to each other. A backlight (not shown) for emitting light in the Z-axis direction is provided on the outer side of the glass substrate 21.

Figure 4:
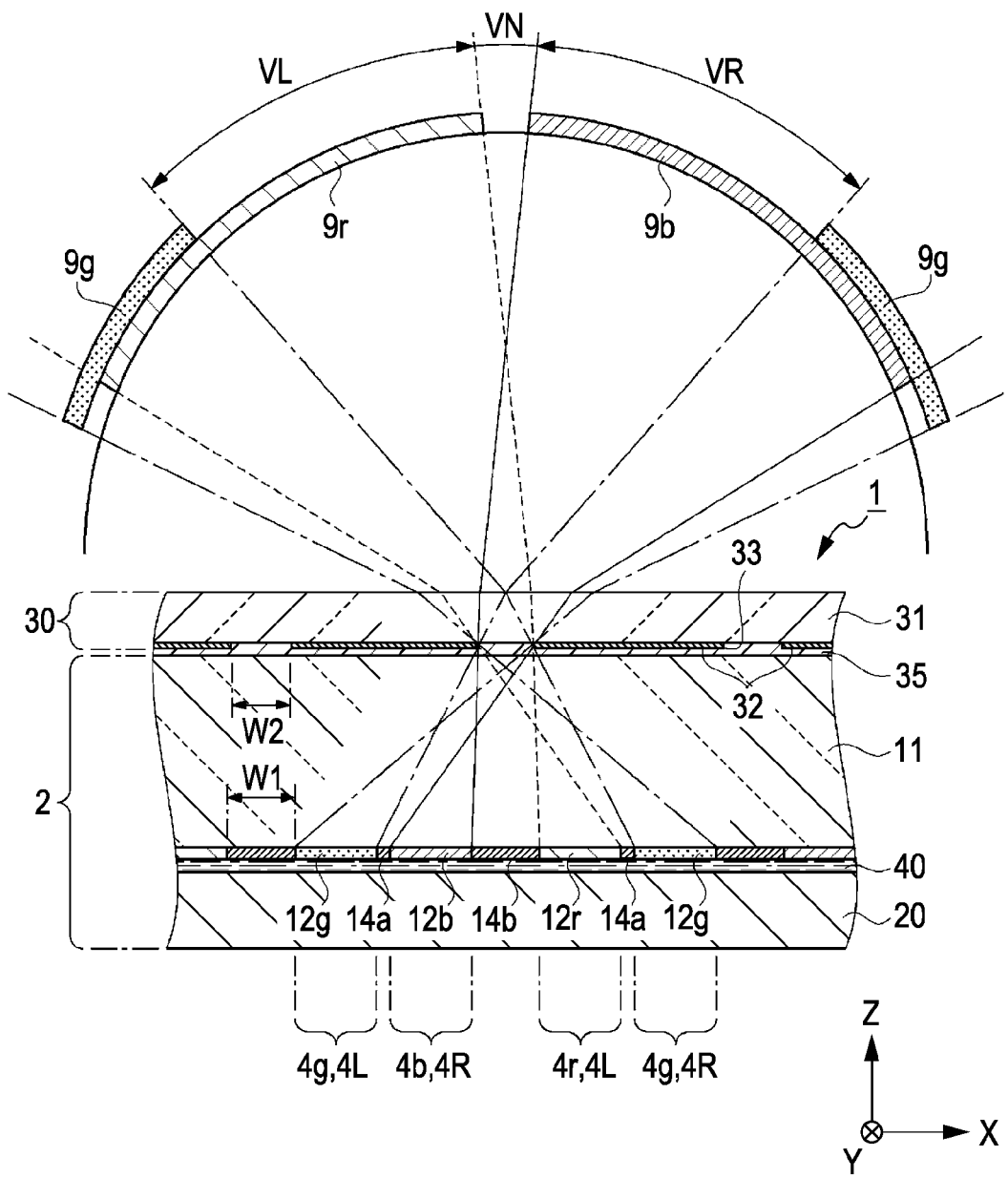
FIG. 4 is an explanatory view showing the cross-sectional structure of the liquid crystal device shown in FIG. 1 along with the viewing angles and the displays viewed at the viewing angles.

FIG. 4 shows a cross-sectional illustration of the liquid crystal device 1 of the above-described configuration. More particularly, FIG. 4 illustrates the relationship between the viewing angle and the display of the liquid crystal device 1. In FIG. 4, attention is paid to light passing through an aperture 33 between a pixel 4b (pixel 4R) and a pixel 4r (pixel 4L). Light passing through the other apertures 33 also behaves in the manner shown in FIG. 4. For convenience of explanation of the optical path, the glass substrate 11 is shown with a larger thickness, and the components of the element substrate 20 are omitted.

Display light from the pixel 4r passes through the aperture 33 and is refracted by the surface of the glass substrate 31, where it is then viewed in the angle range 9r. Similarly, display light from the pixel 4g and display light from the pixel 4b are viewed in the angle ranges 9g and 9b, respectively. The angle range 9r and the angle range 9g overlap, and the angle range 9b and the angle range 9g overlap.

As a result, display light from the pixel 4b is blocked by the barrier layer 32 in the angle range VL and not displayed, so only the display light from the pixel 4r may be viewed. Similarly, the display light from the pixel 4r is blocked by the barrier layer 32 in the angle range VR, and only display light from the pixel 4b may be viewed. In other words, only a first image corresponding to the pixel 4L may be viewed in the angle range VL, and only a second image corresponding to the pixel 4R may be viewed in the angle range VR. In this way, the liquid crystal device 1 can display two different images in the angle ranges VL and VR. The angle ranges VL and VR are approximately 30°.

Thus, in the first exemplary embodiment, there is no mixed region in which both the first and second images are displayed between the angle ranges VL and VR. This is because the width W2 of the apertures 33 is smaller than the width W1 of the light-shielding portions 14b in the pixel row direction. Alternatively, an angle range VN where neither the first or second images is displayed is provided at the front. In the angle range VN, a black display is produced.

Figure 10:
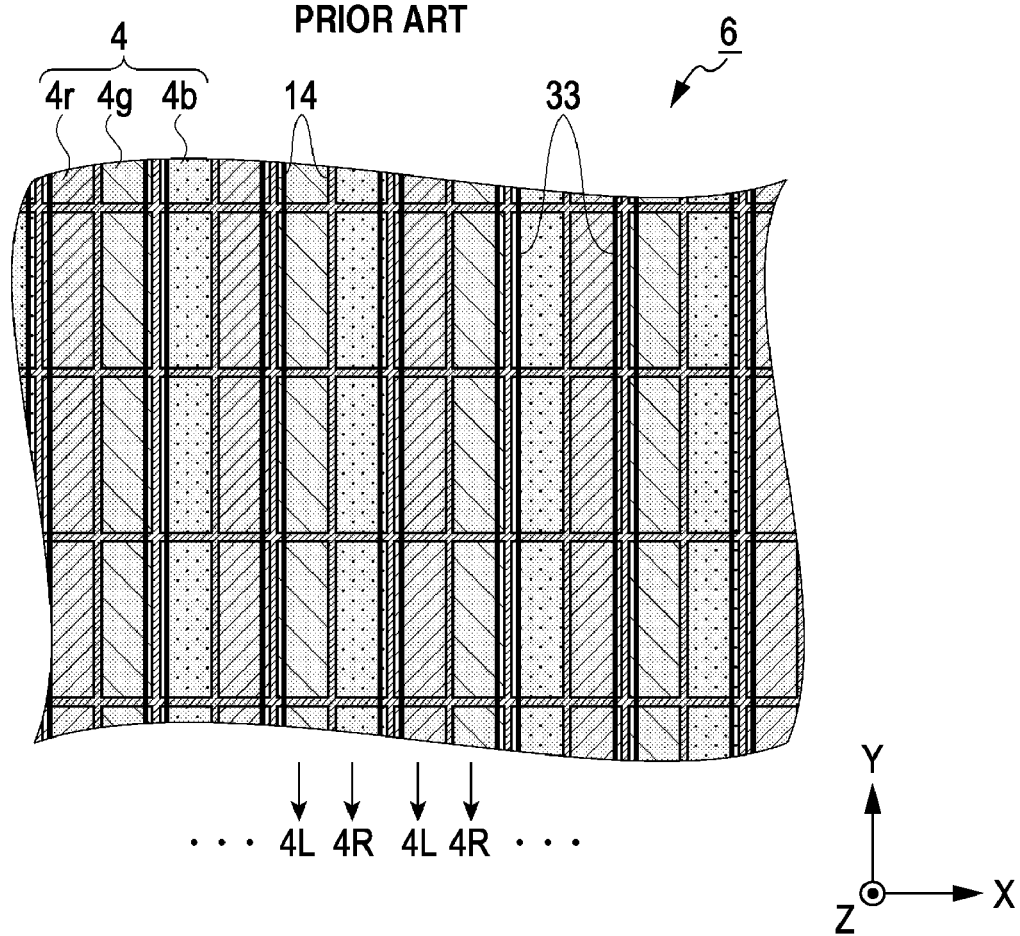
FIG. 10 is an enlarged view of a liquid crystal device in the current art.

Although the width of the apertures 33 is reduced to remove the mixed region, the widths of the light-shielding layers 14b and the apertures 33 are larger than the width of the light-shielding layers 14a, so the apertures 33 are wide enough to transmit much display light. Thus, the first image and the second image can be displayed with high brightness in the angle ranges VL and VR. Further, since the light-shielding layers 14a are not aimed to cover the data lines 28, they can be made thinner than the light-shielding layers 14 of the liquid crystal devices 6 of the current art shown in FIG. 10. Therefore, even when the width of the light-shielding layers 14b is increased, the aperture ratio can be maintained or increased, and the first image and the second image can be displayed with high brightness. In this way, the liquid crystal device 1 according to the first exemplary embodiment can display different images with high brightness in the angle ranges VL and VR while removing the region with the mixed display.

Second Exemplary Embodiment

Figure 5:
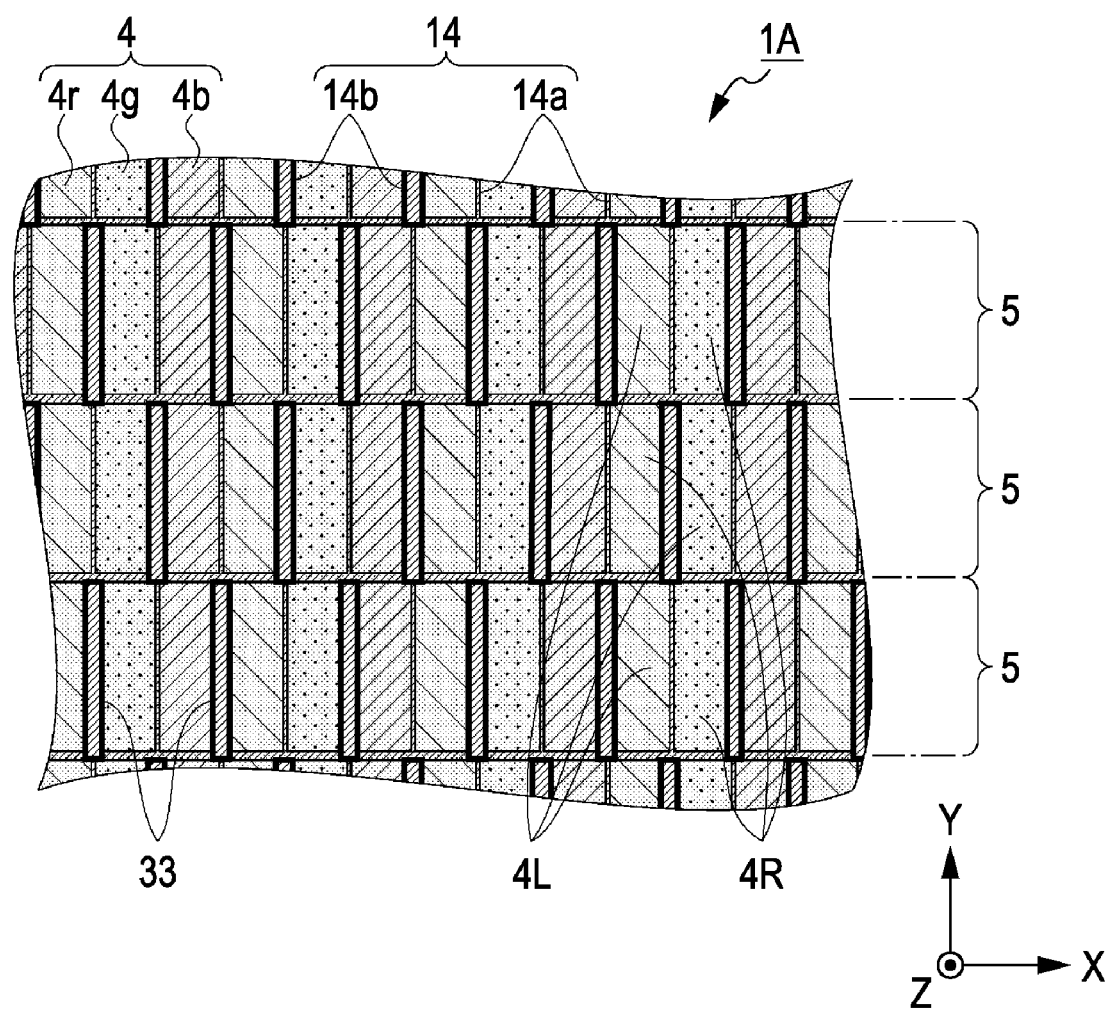
FIG. 5 is an enlarged view of a liquid crystal device according to a second exemplary embodiment of the invention.

A liquid crystal device 1A according to a second exemplary embodiment of the invention will now be described with reference to FIGS. 5 and 6. The liquid crystal device 1A differs from the liquid crystal device 1 of the first exemplary embodiment in the arrangement of pixels 4L, 4R, light-shielding layers 14a and 14b, and apertures 33. Since other structures are similar to those in the liquid crystal device 1, the following description will center on differences. In FIGS. 5 and 6, the same components as those in the first exemplary embodiment shown in FIGS. 1 and 3 are denoted by the same reference numerals, and descriptions thereof are omitted.

Figure 6A:
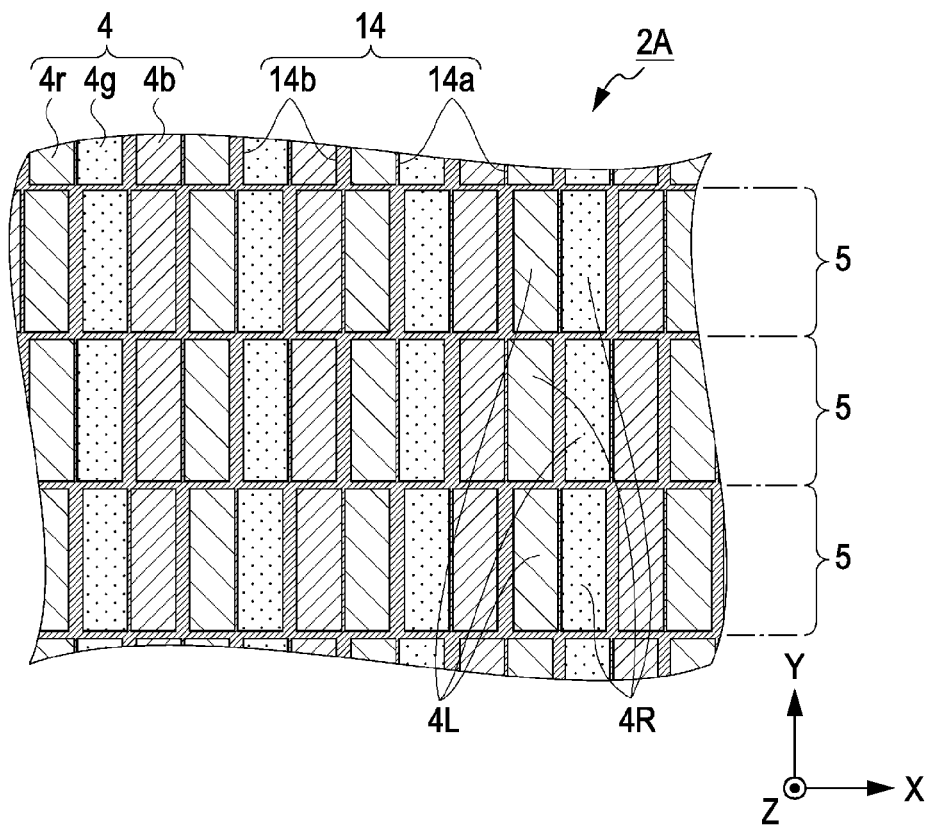
FIG. 6A is an enlarged view of a liquid crystal panel.
Figure 6B:
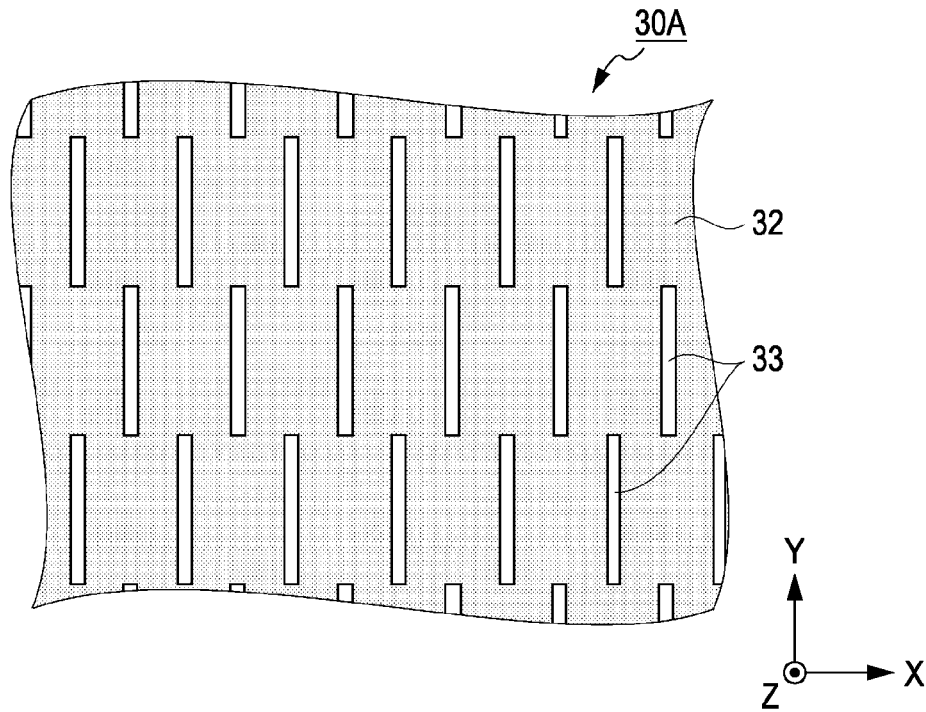
FIG. 6B is an enlarged view of a barrier mask substrate.

FIG. 5 is an enlarged plan view of the liquid crystal device 1A according to the second exemplary embodiment. Similar to the liquid crystal device 1 of the first exemplary embodiment, the liquid crystal device 1A includes a liquid crystal panel 2A which serves as a display panel and a barrier mask substrate 30A bonded together with adhesive 35. FIGS. 6A and 6B are enlarged plan views, respectively, of the liquid crystal panel 2A and the barrier mask substrate 30A before bonding. Hatched portions in FIG. 5 represent a region where a barrier layer 32 of the barrier mask substrate 30A is provided.

As shown in FIG. 6A, the liquid crystal panel 2A includes rectangular pixels 4r, 4g, and 4b respectively for red, green, and blue displays. The pixels 4r, 4g, and 4b are repetitively arranged in the X-axis direction, and are arranged in the Y-axis direction such that pixels 4 of the same color form vertical stripes. Light-shielding layers 14 (including light-shielding layers 14a and 14b) are provided between the adjacent pixels 4.

The pixels 4 include pixels 4L for displaying a first image and pixels 4R for displaying a second image. In the second exemplary embodiment, the pixels 4L and 4R are alternately arranged in the X-axis direction, and are also alternately arranged in the Y-axis direction orthogonal to the X-axis direction.

Each pixel row 5 extending in the X-axis direction includes a pixel 4L, a light-shielding layer 14a, a pixel 4R, and a light-shielding layer 14b, repetitively arranged in that order. The light-shielding layer 14b is wider than the light-shielding layer 14a in the X-axis direction. In the second exemplary embodiment, the light-shielding layer 14a is 10 μm in thickness, and the light-shielding layer 14b is 25 μm in thickness.

The above-described arrangement order of the components in the X-axis direction applies to all pixel rows 5. In contrast to the configuration in the first embodiment, the units of the components are shifted by a half pitch between the adjacent pixel rows 5. That is, the light-shielding layers 14a and the light-shielding layers 14b and the pixels 4L and the pixels 4R are alternately arranged in the Y-axis direction.

Similarly, as shown in FIG. 6B, the apertures 33 provided in the barrier layer 32 of the barrier mask substrate 30A are positioned differently from those in the liquid crystal device 1 of the first exemplary embodiment. The apertures 33 are provided so as to align with the light-shielding layers 14b, as viewed from a direction normal to the liquid crystal panel 2A. Therefore, in the second exemplary embodiment, the apertures 33 are shifted by a half pitch between the pixel rows 5 in accordance with the arrangement of the light-shielding layers 14b. In other words, slit-shaped apertures 33 having a length substantially equal to the width of the pixel rows 5 in the Y-axis direction are obliquely arranged. This barrier layer 32 is also called a step barrier. The width of the apertures 33 is slightly smaller than the width of the light-shielding layers 14b, and is set at 23 μm in the second exemplary embodiment.

In the liquid crystal device 1A having the step barrier 32, the smallest distance between two pixels of same color is $\sqrt{2}$ times the distance of a typical liquid crystal device that does not perform two-screen display. Therefore, display resolution is $1/\sqrt{2}$ times that in the typical liquid crystal device. This characteristic also applies to the pixels 4R. In contrast, when the pixels 4L and 4R are arranged in stripes, as in the liquid crystal device 1 of the first exemplary embodiment, resolution is half that in the typical liquid crystal device. Therefore, the resolution can be increased by $\sqrt{2}$ times by adopting the configuration of the second exemplary embodiment.

The cross-sectional structure of the liquid crystal device 1A and its relationship between the viewing angle and the display are similar to those adopted in the liquid crystal device 1 of the first exemplary embodiment, and are shown in FIG. 4. Therefore, the liquid crystal device 1A of the second exemplary embodiment can also display different images with high brightness in the angle ranges VL and VR while eliminating the region where the display is mixed.

Third Exemplary Embodiment

Figure 7:
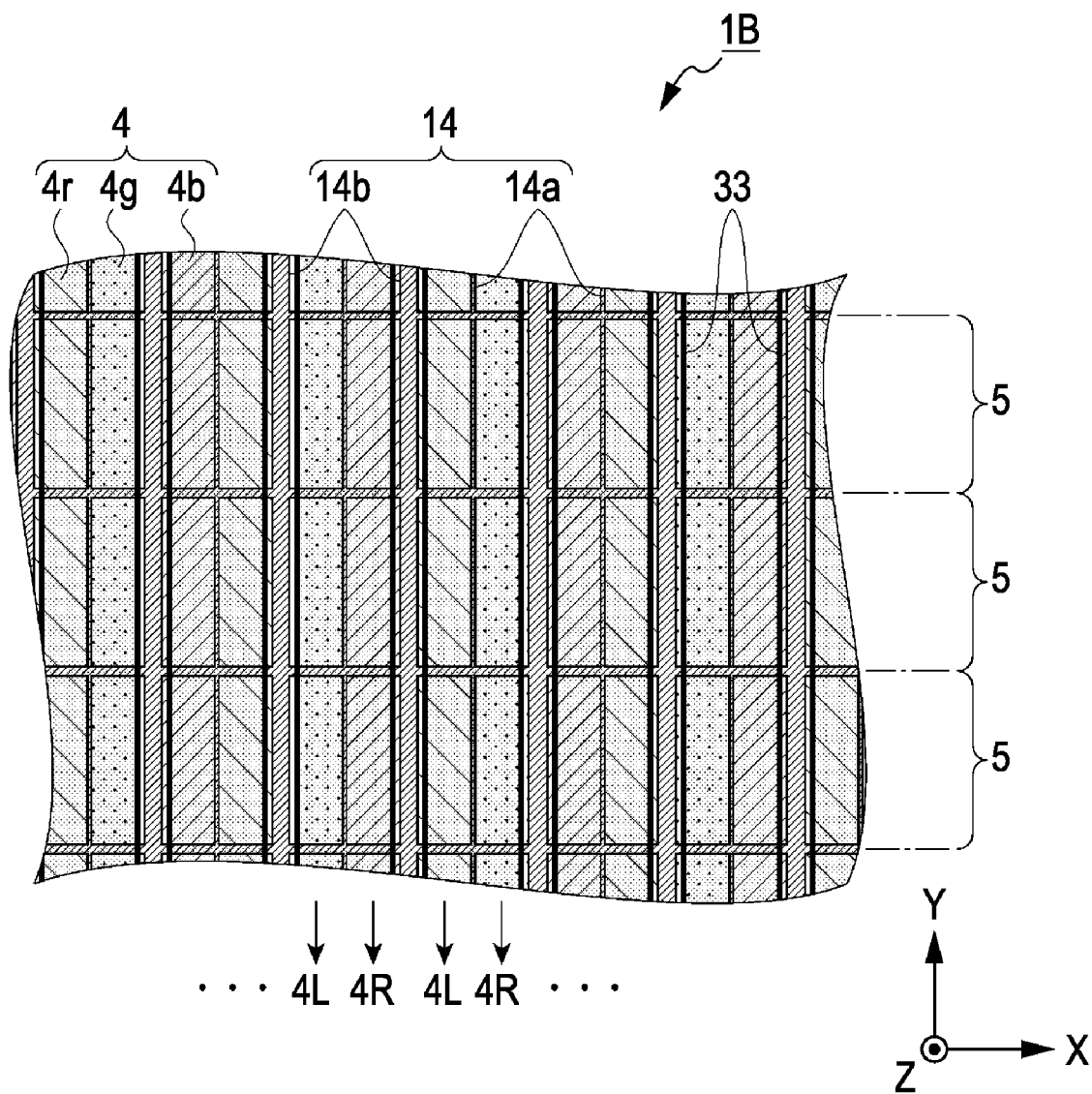
FIG. 7 is an enlarged view of a liquid crystal device according to a third exemplary embodiment of the invention.
Figure 8:
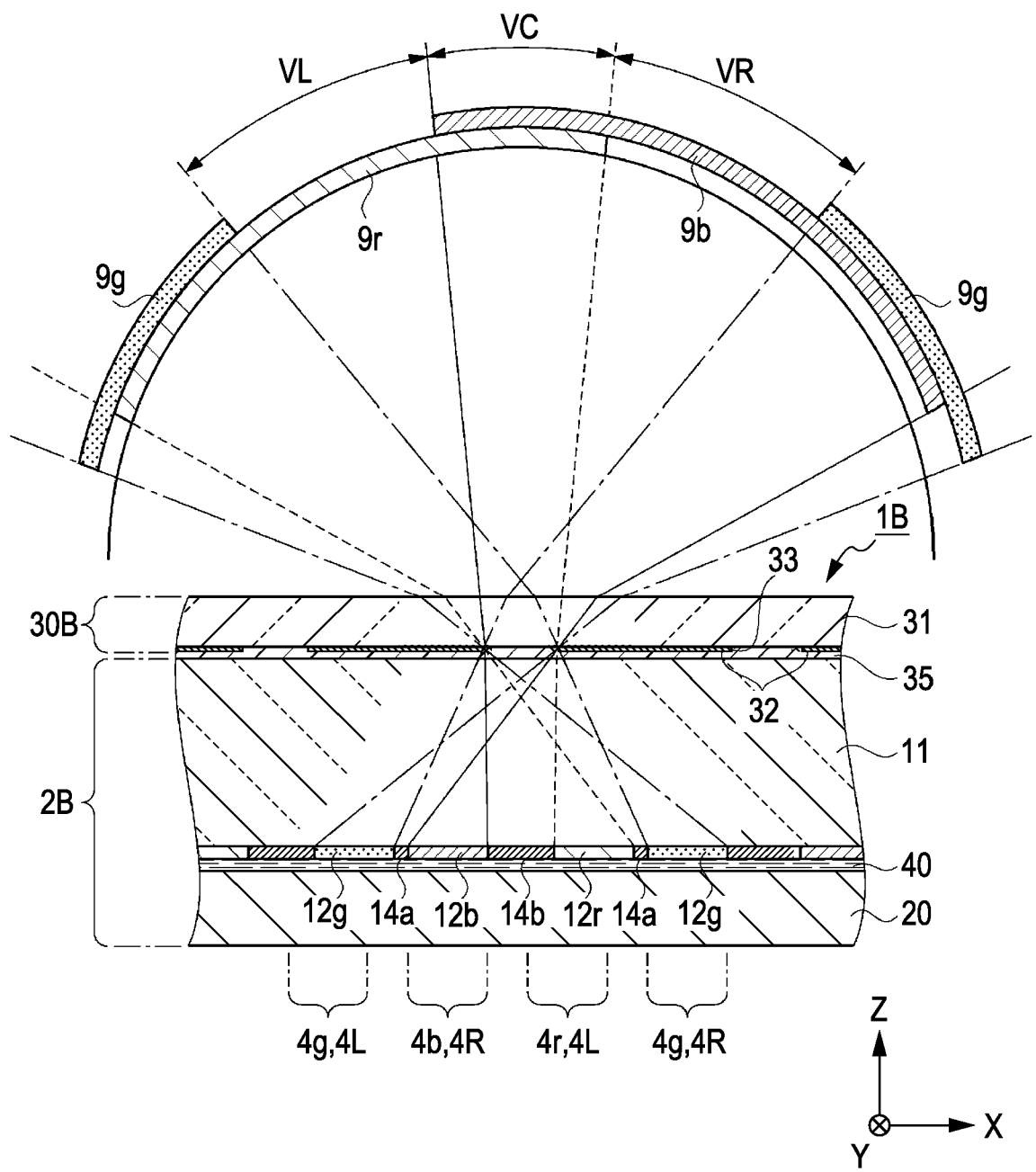
FIG. 8 is an explanatory view showing the cross-sectional structure of the liquid crystal device shown in FIG. 7 along with the viewing angles and the various displays viewed at the viewing angles.

A liquid crystal device 1B according to a third exemplary embodiment of the invention will now be described with reference to FIGS. 7 and 8. The liquid crystal device 1B differs from the liquid crystal device 1 of the first exemplary embodiment in the width of apertures 33 provided in the barrier layer 32. Since the other structures are similar to those in the liquid crystal device 1, the following description will center on differences. In FIGS. 7 and 8, the same components as those in the first exemplary embodiments shown in FIGS. 1 and 4 are denoted by the same reference numerals, and descriptions thereof are omitted.

FIG. 7 is an enlarged plan view of the liquid crystal device 1B according to the third exemplary embodiment. Similarly to the liquid crystal device 1, the liquid crystal device 1B includes a liquid crystal panel 2B serving as a display panel and a barrier mask substrate 30B that are bonded together with adhesive 35, as shown in FIG. 8. Hatched portions in FIG. 7 represent regions where the barrier layer 32 of the barrier mask substrate 30B is provided. As shown in FIG. 7, the width of apertures 33 in the barrier layer 32 is slightly larger than the width of light-shielding layers 14b. In the third exemplary embodiment, the apertures 33 are 25 μm in thickness, the light-shielding layers 14b are 23 μm in thickness, and light-shielding layers 14a are 10 μm in thickness.

FIG. 8 shows a cross-sectional structure of the liquid crystal device 1B having the above-described configuration along with the various viewing angles. Display light from a pixel 4r passes through an aperture 33, is refracted by a surface of a glass substrate 31, and is viewed in the angle range 9r. Similarly, display light from pixels 4g and 4b is viewed in the angle ranges 9g and 9b. The angle range 9r and the angle range 9b overlap, the angle range 9r and the angle range 9g, and the angle range 9b and the angle range 9g overlap.

As a result, the display light from the pixel 4b is blocked by the barrier layer 32 in the angle range, and only the display light from the pixel 4r is viewed. In an angle range VR, the display light from the pixel 4r is blocked by the barrier layer 32, and only the display light from the pixel 4b is shown. In other words, only a first image corresponding to a pixel 4L is viewed in the angle range VL, and only a second image corresponding to a pixel 4R is viewed in the angle range VR. Thus, the liquid crystal device 1B can display two different images in the angle ranges VL and VR. The angle ranges VL and VR are approximately 30°.

Unlike the first exemplary embodiment, display light from both the pixel 4r and the pixel 4b may be viewed in the front angle range VC. That is display light from both the pixel 4r and the pixel 4b may be viewed in the front angle range VC, because the width of the apertures 33 is larger than that of the light-shielding layers 14b. However, the angle range VC may be limited to approximately 15° by creating a small difference between the width of the apertures 33 and the width of the light-shielding layers 14b. In comparison to the angle range VC of approximately 30° in the liquid crystal device 6 shown in FIG. 11, the size of the region where the images are mixed in the third exemplary embodiment is smaller, meaning that it is more comfortable to the viewer. By limiting the region with the mixed display to the front, the display brightness of the first and second images in the angle ranges VL and VR can be further increased. Particularly, brightness can be maintained in the angle ranges VL and VR.

Mounting Examples in Electronic Apparatuses

Figure 9:
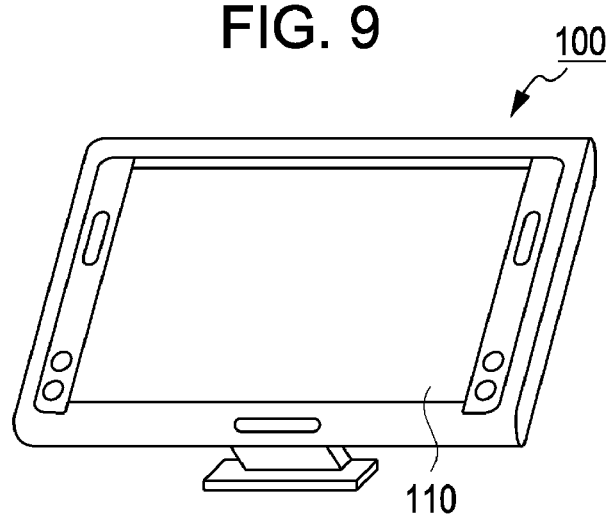
FIG. 9 is a perspective view of a display device for use in a car navigation system.

The above-described liquid crystal device 1 (including the liquid crystal devices 1A and 1B, and the following description) can be mounted in a display device 100 for a car navigation system, such as in the electronic apparatus shown in FIG. 9. The display device 100 can display two images in different directions with high brightness on the liquid crystal device 1 incorporated in a display section 110. For example, the display device 100 can display a map image on the driver's side, and a movie image on the front passenger's side.

The liquid crystal device 1 according to the exemplary embodiments of the invention can be applied not only to the above-described display device 100, but also to various electronic apparatuses such as mobile computers, digital cameras, digital video cameras, car-mounted equipment, and audio equipment.

While the exemplary embodiments of the invention have been described above, various modifications can be made to the embodiments without departing from the scope of the invention. The following modifications are conceivable:

First Modification

While the electronic apparatuses according to the embodiments of the invention are applied to the liquid crystal devices, they can be applied to various electrooptical devices that are capable of generating a display using electrical signals. For example, the barrier mask substrate 30 can be bonded to a display panel such as an organic EL (electro luminescence) display, a PDP (plasma display panel), or a CRT (cathode-ray tube) display.

Second Modification

While the barrier mask substrate 30 is provided on the viewer side of the liquid crystal panel 2 in the above-described exemplary embodiments, it can be provided on the back side of the liquid crystal panel 2, that is, between the liquid crystal panel 2 and the backlight. This structure also allows two-screen display with high brightness.

Third Modification

While IPS is used as the liquid crystal mode in the above-described exemplary embodiments, the liquid crystal mode is not limited thereto. Instead of IPS, various liquid crystal modes such as FFS (fringe field switching), VA (vertical alignment), TN (twisted nematic), and STN (super twisted nematic) modes can be used. However, since two images are displayed in directions at angles to the front, it is preferable to select IPS, FFS, or VA in order to create a wide viewing angle.

What is claimed is:

1. An electrooptical device configured to simultaneously display a first image and a second image in different directions, the electrooptical device comprising:
a display panel comprising the repetitive arrangement of a plurality of pixel rows, each pixel row including a plurality of first pixels for displaying the first image alternating with a plurality of second pixels for displaying the second image, and a plurality of first light-shielding portions alternating with a plurality of second light-shielding portions which are wider than the first light-shielding portions, the first and second light-shielding portions being provided between adjacent pixels;
a light-transmissive substrate provided parallel to the display panel; and
a light-shielding barrier layer provided on the light-transmissive substrate, the light-shielding barrier layer including apertures which align with the second light-shielding portions when viewed from a direction that is normal to the display panel.

2. The electrooptical device according to claim 1, wherein the series of first pixels, the first light-shielding portions, the series of second pixels, and the second light-shielding portions are arranged, respectively, to form stripes which are in a direction that is orthogonal to the pixel rows.

3. The electrooptical device according to claim 2, further comprising:
switching elements provided in the series of first pixels and the series of second pixels; and
data lines connected to the switching elements, which are aligned with the second light-shielding portions as viewed from a direction which is normal to the display panel.

4. The electrooptical device according to claim 1, wherein the pixels in the pixel rows alternate between the first pixels and the second pixels and the light-shielding portions alternate between the first light-shielding portions and the second light-shielding portions.

5. The electrooptical device according to claim 1, wherein the width of the apertures in the light-shielding barrier is smaller than or equal to the width of the second light-shielding portions in the pixel rows.

6. An electronic apparatus comprising a display section including the electrooptical device according to claim 1.

7. An display for an electrooptical device configured to simultaneously display a first image and a second image in different directions, the display comprising:
a display panel comprising the repetitive arrangement of a plurality of pixel rows, each pixel row including a plurality of first pixels for displaying the first image alternating with a plurality of second pixels for displaying the second image, and a plurality of first light-shielding portions alternating with a plurality of second light-shielding portions which are wider than the first light-shielding portions, the first and second light-shielding portions being provided between adjacent pixels;
a light-transmissive substrate provided on the display panel; and
a light-shielding barrier layer provided on the light-transmissive substrate, the light-shielding barrier layer including apertures which align with the second light-shielding portions when viewed from a direction that is normal to the display panel;
wherein the series of first pixels, first light-shielding portions, second pixels, and second light-shielding portions are arranged, respectively, to form stripes which are in a direction that is orthogonal to the pixel rows.

8. The display according to claim 7, further comprising:
switching elements provided in the series of first pixels and the series of second pixels; and
data lines connected to the switching elements, which are aligned with the second light-shielding portions as viewed from a direction which is normal to the display panel.

9. The electrooptical device according to claim 7, wherein the width of the apertures in the light-shielding barrier is smaller than or equal to the width of the second light-shielding portions in the pixel rows.

* * * * *